(12) United States Patent
Gravlin et al.

(10) Patent No.: US 7,902,705 B2
(45) Date of Patent: Mar. 8, 2011

(54) GENERATOR HOUSING, TRANSPORT MECHANISM FOR THE SAME, AND COOLING AND SOUND ATTENUATION METHOD FOR THE SAME

(75) Inventors: Raymond William Gravlin, White Bear Lake, MN (US); John Carl Klesk, St. Anthony Village, MN (US); Paige Nelson, Minnetonka, MN (US); Alanna Hebner, Minneapolis, MN (US); Michael Zamarripa, St. Paul, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 376 days.

(21) Appl. No.: 12/026,883

(22) Filed: Feb. 6, 2008

(65) Prior Publication Data

US 2008/0185801 A1  Aug. 7, 2008

Related U.S. Application Data

(60) Provisional application No. 60/899,809, filed on Feb. 6, 2007.

(51) Int. Cl.
*H02K 5/00* (2006.01)
*H02K 9/00* (2006.01)

(52) U.S. Cl. ............ 310/89; 310/59; 310/52; 290/1 A; 290/1 B

(58) Field of Classification Search ............ 310/52–64, 310/89; 290/1 A, 1 B
See application file for complete search history.

(56) References Cited

U.S. PATENT DOCUMENTS

| | | | |
|---|---|---|---|
| 5,624,589 A * | 4/1997 | Latvis et al. | 219/133 |
| 5,998,896 A | 12/1999 | Early et al. | |
| 6,051,809 A * | 4/2000 | Colella | 219/133 |
| 6,124,567 A | 9/2000 | Feldhausen et al. | |
| 6,731,036 B2 | 5/2004 | Ghiotto | |
| D564,450 S | 3/2008 | Gravlin et al. | |

* cited by examiner

*Primary Examiner* — Quyen Leung
*Assistant Examiner* — Leda Pham
(74) *Attorney, Agent, or Firm* — Hamre, Schumann, Mueller & Larson, P.C.; J. Bruce Schelkopf

(57) ABSTRACT

A generator housing includes a top portion, a plurality of side portions, and a base portion. The top, sides, and base portions are connected to form an enclosure, such that a generator can be housed inside the enclosure. The top and side portions include an air and exhaust flow structure that facilitates cooling of a generator maintained inside the housing, that provides a sound attenuation function, and that releases exhaust created by a generator. At least one of the side portions and the top portion may be opened and closed to provide access inside the housing. The base portion includes a structure that facilitates installation and transport.

18 Claims, 14 Drawing Sheets

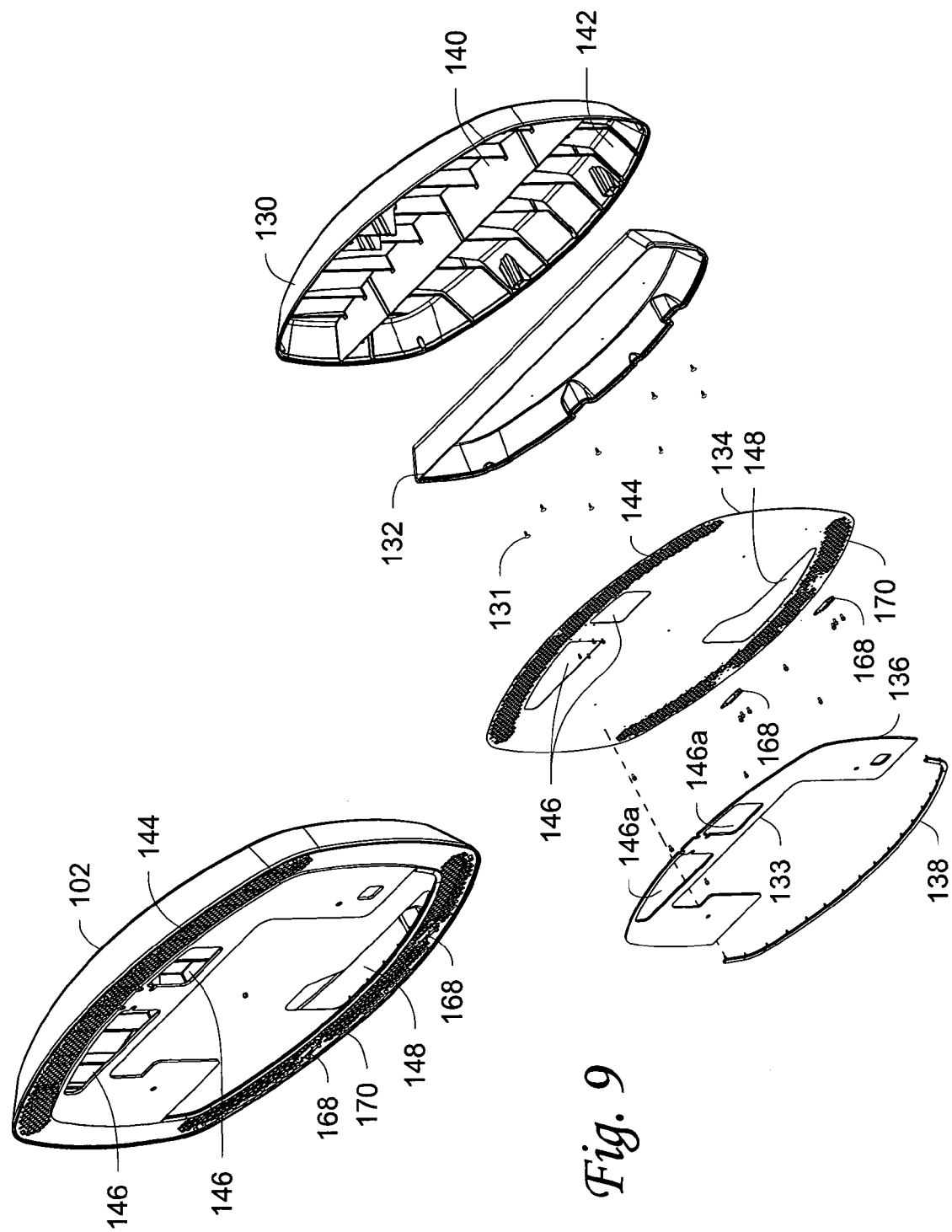

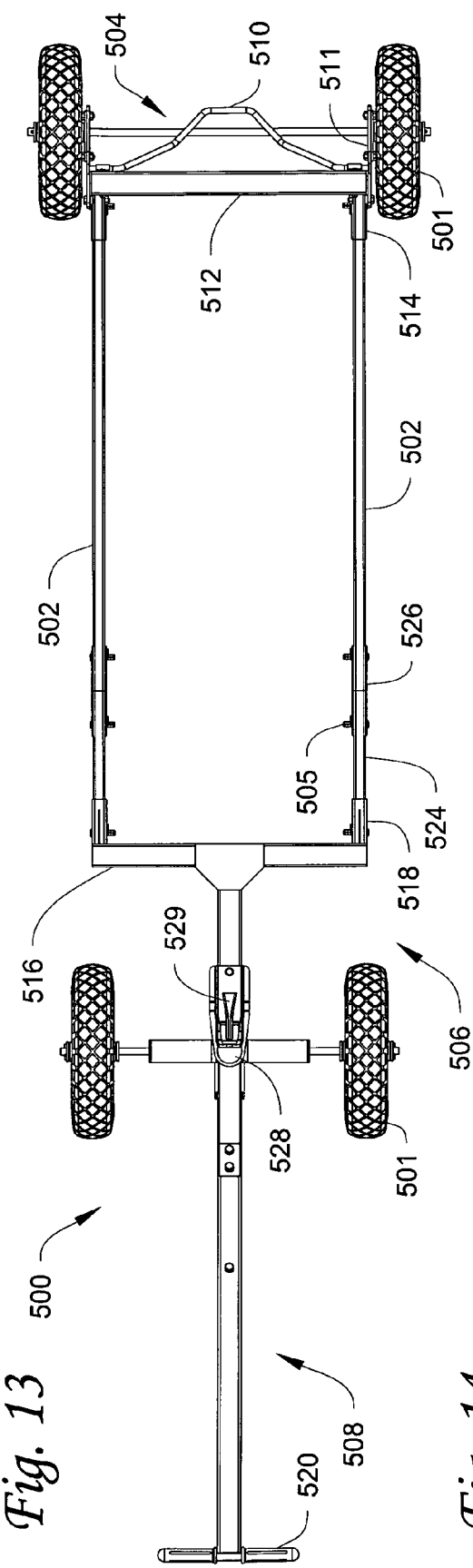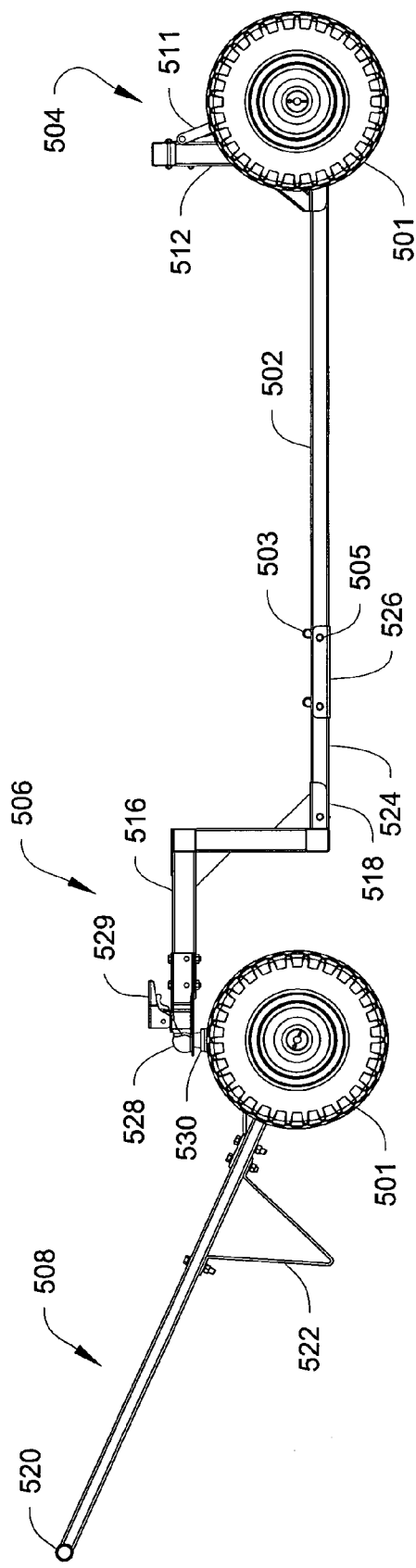
Fig. 13
Fig. 14

GENERATOR HOUSING, TRANSPORT MECHANISM FOR THE SAME, AND COOLING AND SOUND ATTENUATION METHOD FOR THE SAME

This application claims the benefit of U.S. Provisional Patent Application Ser. No. 60/899,809, filed Feb. 6, 2007, which is entitled "Generator Housing" and is herewith incorporated by reference in its entirety.

FIELD

A generator housing that can facilitate cooling and sound attenuation of a generator, and that can provide ease of installation/removal, maintenance, and transport of the housing and a generator that can be contained therein. For example, a generator housing is provided that is particularly useful with a home standby generator set.

BACKGROUND

Standby generators are widely known and used. Typically, these generators are used to provide emergency power during sudden power outages, for example in severe weather conditions, in a power blackout, and/or in an overworked power grid. Such generators can provide whole house or office backup power, and can be used as a main power source. These standby generators usually are located outside and are connected to a fuel supply, such as a natural gas line or tank (i.e. propane tank). A housing structure contains the generator to about an overall size of a typical central air conditioner unit, and has been known to provide a durable construction with lockable doors and sound attenuation features.

However, such known generator housings have shortcomings in that they do not provide satisfactory cooling air to a generator, and do not provide optimal sound attenuation, such as when a generator is in use. Furthermore, such generator housings do not provide easy access, so that a generator can be installed, repaired, and/or transported.

Thus, further improvements may be made upon existing generator housings, such as to provide a cooling function to the generator, improve sound attenuation, and provide ease of access for installation, maintenance and transport.

SUMMARY

The following technical disclosure describes an improved structure for a generator housing. Some benefits of the housing structure include facilitating flow of air and exhaust within the housing to maintain cooling of a generator in the housing and provide an improved sound attenuation function. The generator housing provides for ease of installation, maintenance, and transport.

In one embodiment, a generator housing comprises a top portion, a plurality of side portions, and a base portion, where the top, sides, and base portions are connected to form an enclosure, such that a generator can be housed inside the enclosure. The top and side portions include an air and exhaust flow structure that facilitates intake of air to maintain cooling of a generator that can be contained inside the housing; that provides a sound attenuation function; and that releases exhaust created by a generator and cooling air from inside the housing. At least one of the side portions and the top portion may be opened and closed to provide access inside the housing. The base portion includes a structure that facilitates installation, transport and ease of manufacturing assembly.

In one embodiment, the top and side portions include flow chambers to direct air and exhaust flow throughout and inside the housing. The top and side portions include openings for intake of air from outside of the housing to the inside of the housing, and include openings for release of exhaust from inside of the housing to the outside of the housing.

In another embodiment, the top portion and at least one of the side portions may be opened and closed to allow access to the inside of the housing.

In yet another embodiment, the base portion includes a structure having a space for mounting a generator, and a support for the overall housing and a generator that may be contained in the housing. The base portion provides a clearance area to facilitate transport and installation/removal.

In yet another embodiment, equipment is used to install, remove and/or transfer the generator housing and a generator that may be contained therein. The equipment includes a structure that cooperates with at least the base portion of the generator housing to facilitate installation, removal, and/or transfer.

BRIEF DESCRIPTION OF THE DRAWINGS

FIG. 8 illustrates a perspective view of the top portion of the generator housing shown in FIG. 1.

FIG. 9 illustrates an exploded perspective view of one embodiment of the top portion of the generator housing shown in FIGS. 1 and 8.

FIG. 13 illustrates a top view of the transport equipment of FIG. 11.

FIG. 14 illustrates a side view of the transport equipment of FIG. 11.

DETAILED DESCRIPTION

Figure 1:
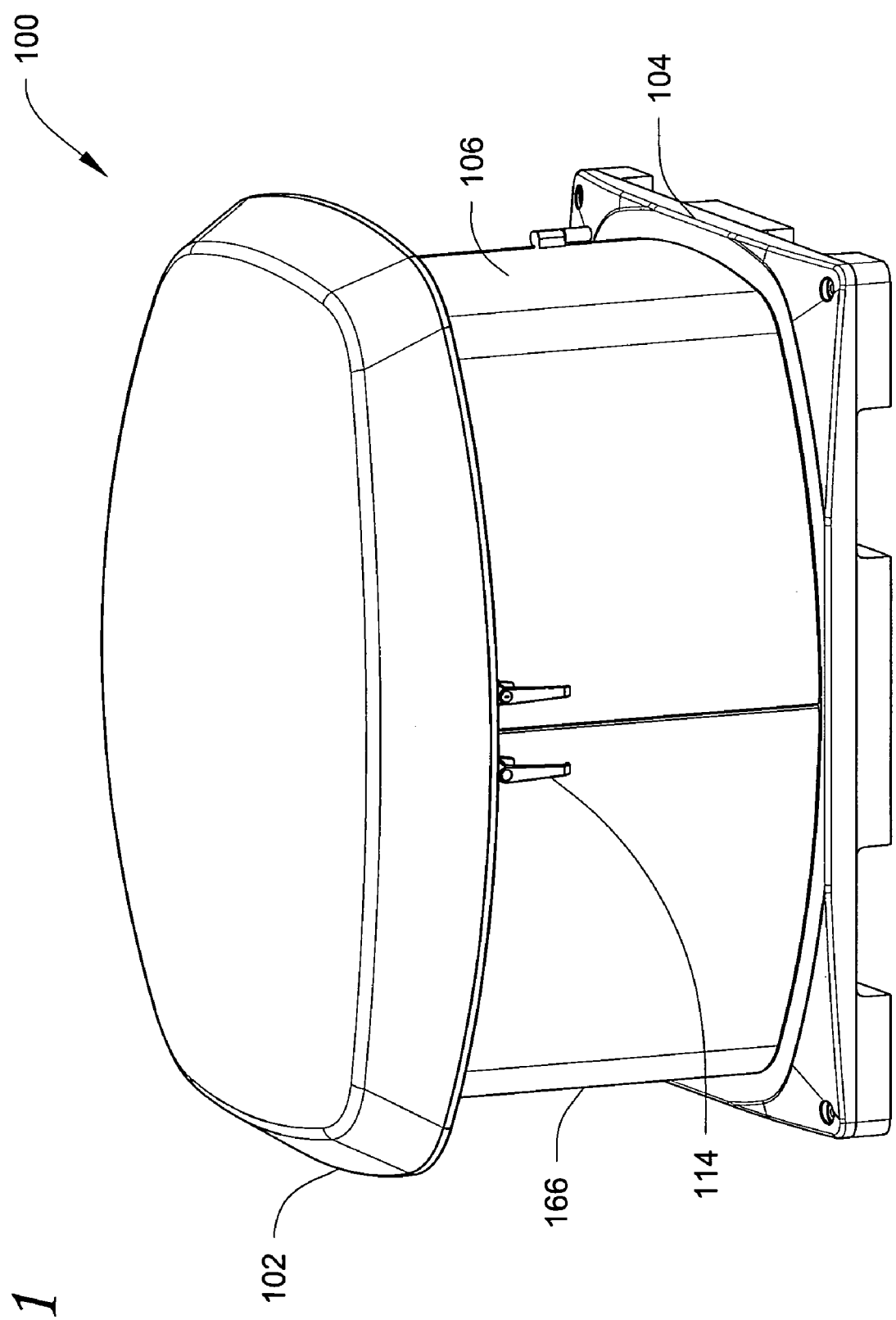
FIG. 1 illustrates a top frontal perspective view of one embodiment of generator housing.

The generator housing described herein can facilitate cooling of a generator housed inside the housing, provide improved sound attenuation, and provide ease of installation, maintenance and transport. In general, a housing includes a top portion, a plurality of side portions, and a base portion. The top, sides, and base portions are connected to form an enclosure, such that a generator can be housed inside the enclosure. The top and side portions include an air and exhaust flow structure that facilitates cooling of a generator maintained inside the housing and that provides a sound attenuation function. At least one of the side portions and the top portion may be opened and closed to provide access inside the housing. The base portion includes a structure that facilitates installation and transport.

FIGS. 1-4 illustrate multiple perspective views of one embodiment of a generator housing 100. The generator housing includes a top portion 102, a base portion 104, and side portions 106, 166, 186. The top 102, base 104, and side 106, 166, 186 portions are connected to form an enclosure for housing a generator. The top 102 and side 106 portions reside over the base portion 104.

In one example, the generator housing 100 forms an enclosure that can contain, for example a standby generator, such as a home or small office standby generator set having an overall size of a typical central air conditioner unit. In one embodiment, the housing has an overall shape and dimension resembling a curved or oblong rectangular-like structure. It will be appreciated that the dimension and shape of the housing 100 may be modified as necessary to suitably contain generators of varying increased and decreased sizes. For example, the height of the housing 100 may be modified, where the dimension of the side portions 106, 166, 186 are modified to accommodate the size of a desired generator to be used. It will also be appreciated that the top 102 and base 104 portions may also be modified if necessary.

Figure 3:
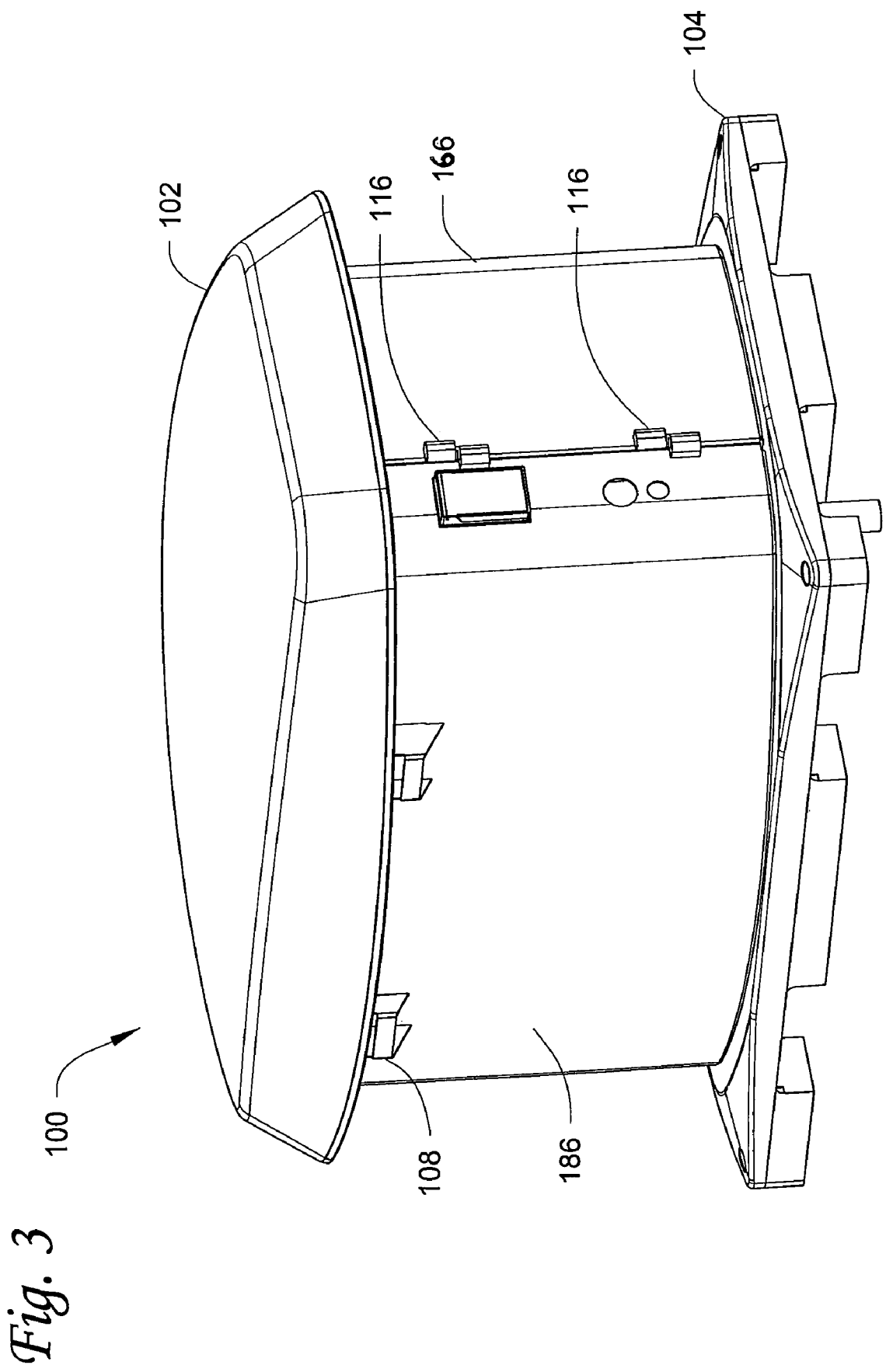
FIG. 3 illustrates a top rearward perspective view of the generator housing shown in FIG. 1.
Figure 4:
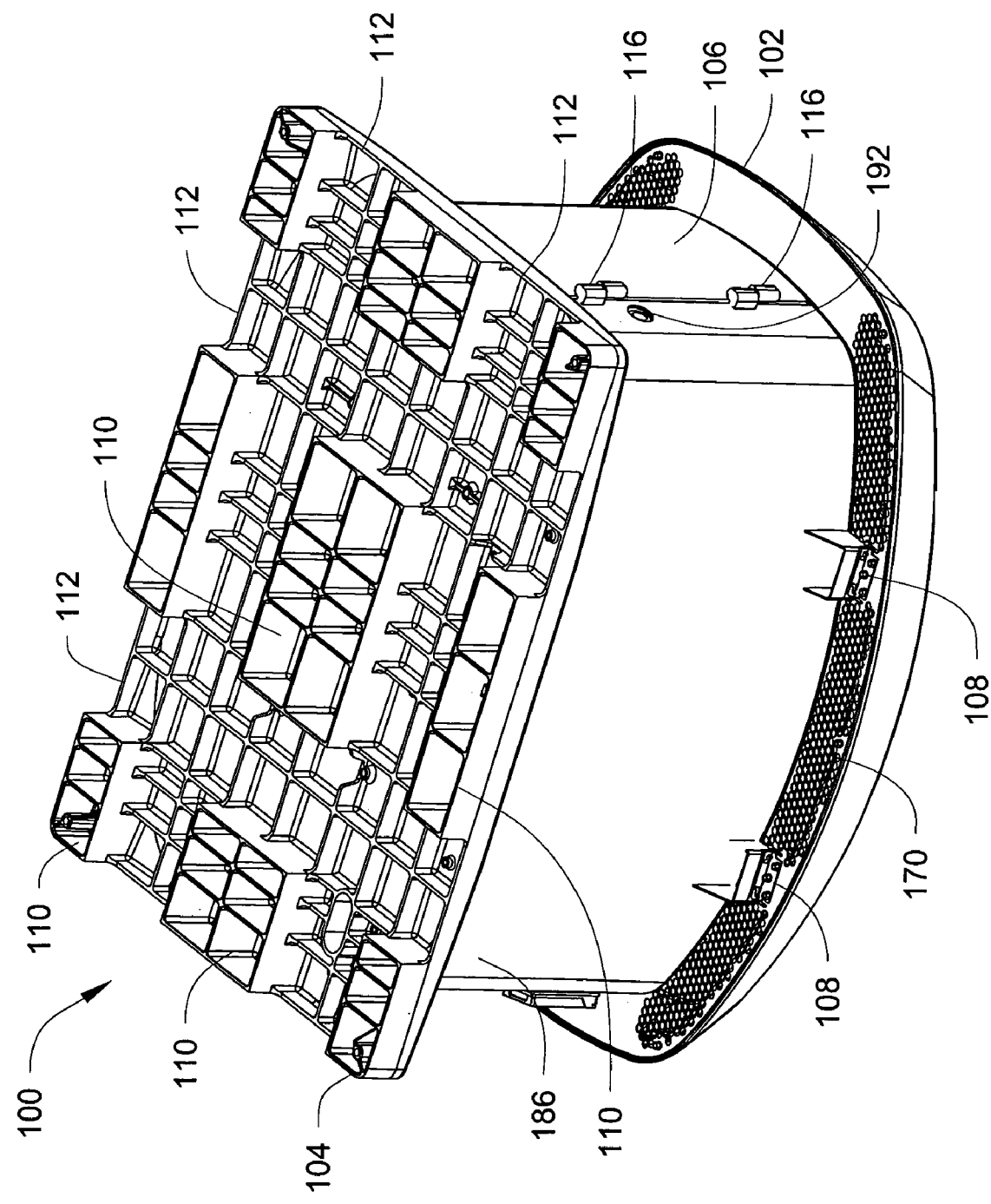
FIG. 4 illustrates a bottom rearward perspective view of the generator housing shown in FIG. 1.

In one embodiment, and as best shown in FIGS. 3 and 4, hinge brackets 108 connect the top portion 102 to one of the side portions through the hinges 168. (See FIGS. 8-9 for hinges 168.) In one embodiment, the hinge brackets 108 are disposed on a rear side portion 186, where the hinge brackets 108 connect the rear side portion 186 to the top portion 102 through hinges 168. The hinge brackets 108 and hinges 168 are oriented along an axis extending in a direction parallel to the long side of the housing 100. In this exemplary configuration, the top portion 102 is rotatably connected on the backside of the housing 100, where the top portion 102 can be lifted up to open and/or close the housing 100 from its long side. When the top portion 102 is opened, the inside of the housing 100 is exposed. In this manner, the top portion 102 acts as a cover structure that can be opened and closed.

Hinges 116 are also used to connect the side portions 106, 166, 186. In one exemplary embodiment, two side portions 106, 166 are connected to the rear side portion 186 through hinges 116. As best shown in FIGS. 3 and 4, the hinges 116 are oriented along an axis extending in a direction perpendicular to the long side of the housing 100. In this exemplary configuration, the side portions 106, 166 are right and left side portions that are rotatably connected to the rear side portion 186. The side portions 106, 166, which reside along the front and substantially along the right and left sides of the housing 100, may be opened and/or closed, and when opened can expose the inside of the housing 100. In one embodiment, the side portions 106, 166 may be rotated such that they open or swing away from the inside of the housing 100 from the right and left sides. In this configuration, the portions 106, 166 may provide a door-like structure for accessing the inside of the housing 100 (best shown in FIG. 5 described below).

Figure 5:
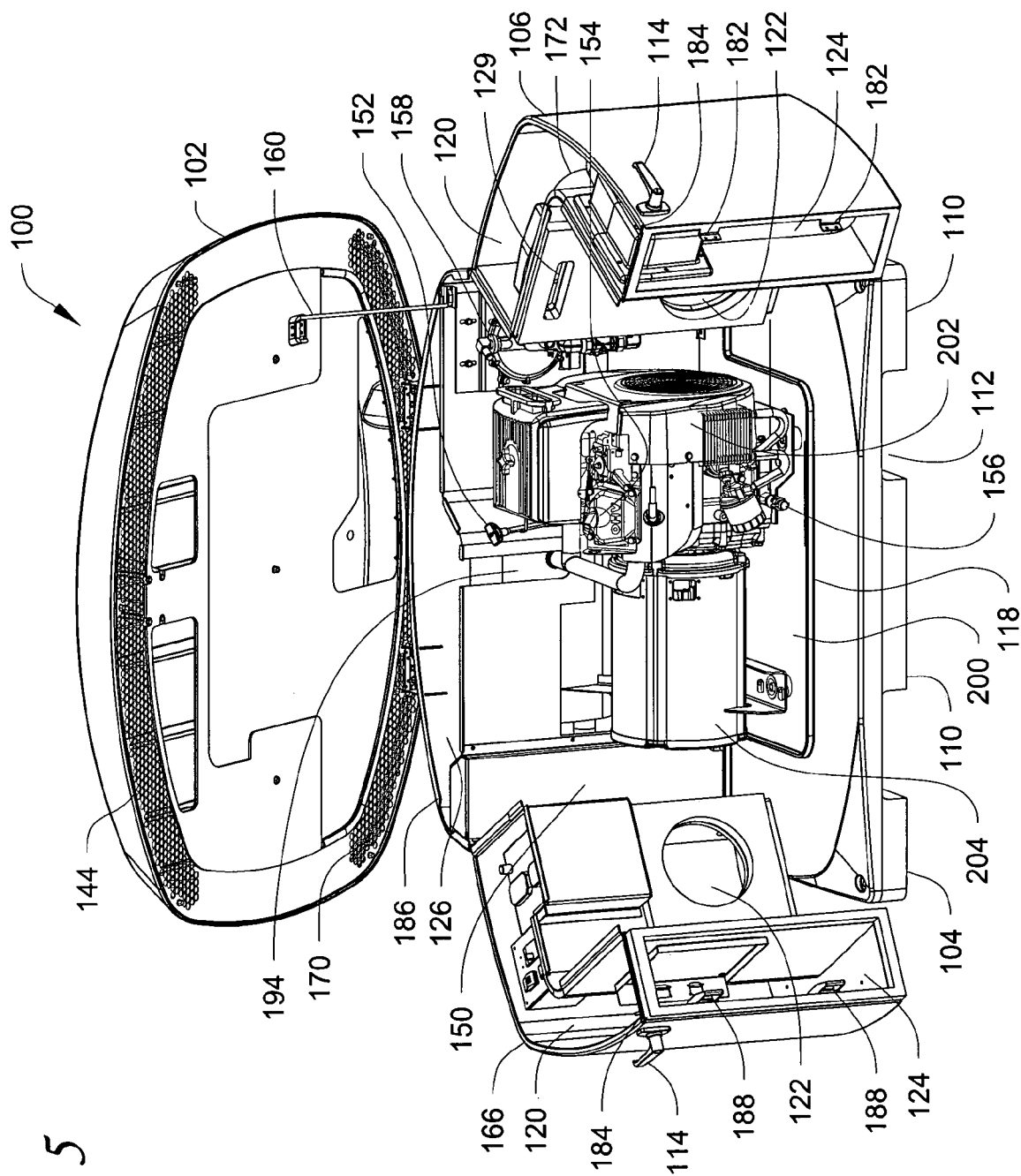
FIG. 5 illustrates a perspective view of the generator housing shown in FIG. 1 showing the generator housing in an open configuration and showing one embodiment of a generator inside the generator housing.

Handles 114 are disposed on the side portions 106, 166. In one embodiment, the handles 114 are provided on the side portions 106, 166. In this exemplary configuration, the handles 114 allow for the side portions 106, 166 (or doors) to be manually opened and/or closed by a user or operator, and allow for the side portions 106, 166 to be locked. The handles 114 are also used to secure the top portion 102 to the side portions 106, 166 to fully seal and lock the top and side portions. A latch 184 disposed opposite each of the handles 114 may be opened and closed when the handles 114 are respectively rotated to an open or closed position. As shown in FIGS. 1-4, the handles 114 are in the closed position, while FIG. 5 shows the handles 114 in the open position. The latches 184 act as catch structures that engage and secure an edge of the top portion 102 to seal and lock the top portion 102 to the side portions 106, 166. An additional latch structure 182, 188 is disposed at ends of the side portions 106, 166. Each latch portion 182 mates with latch portion 188 to close and seal the side portions 106, 166 together when the housing is to be closed. It will be appreciated that the handles 114 and latches 184, 182, 188 are exemplary only as other open/close and lock/unlock structures may be used that are equally or more suitable.

The top and side portions are constructed to be movable, so as to provide excellent clearance and wide open access to the inside of the housing. In the structure described, the hinges, handles, and latches respectively provide for opening of the top and side portions without having to remove or detach them from the other portions of the housing. It will be appreciated that the hinge structures may be constructed such that the top and side portions can be easily removed if desired or necessary with the use of minimal or no tools, such as being lifted out of their hinge connections The specific hinge, handle, and latch structures and their configuration with respect to the top and side portions are merely exemplary. Other opening/closing structures, configurations, and arrangements may also be employed. It further will be appreciated that the top and side portions are not limited to the specific structures and arrangement shown, so long as they can be opened to provide good clearance and good access to the inside of the housing.

As described, the top 102 and side 106, 166, 186 portions reside over the base portion 104. In one example, the top portion 102 is disposed on the side portions 106, 166, 186, and the side portions 106, 166, 186 are set on the base portion 104. In one embodiment, the rear side portion 186 is mechanically connected to the base portion 104, so that the other side portions 106, 166 (i.e. doors) can freely rotate as described. The base portion 104 includes a top surface area that allows the side portions 106, 166, 186 to be disposed thereon. In one embodiment, the top surface area of the base portion 104 is larger than a perimeter taken up by the side portions 106, 166, 186. In this exemplary configuration, the base portion 106 resembles a built-in base pad. This eliminates the need for a separate cement pad or other preparatory surface in order to set down the housing and any generator that may be contained in the housing. With the built-in base portion 104, such a configuration also reduces installation time and costs.

Figure 2:
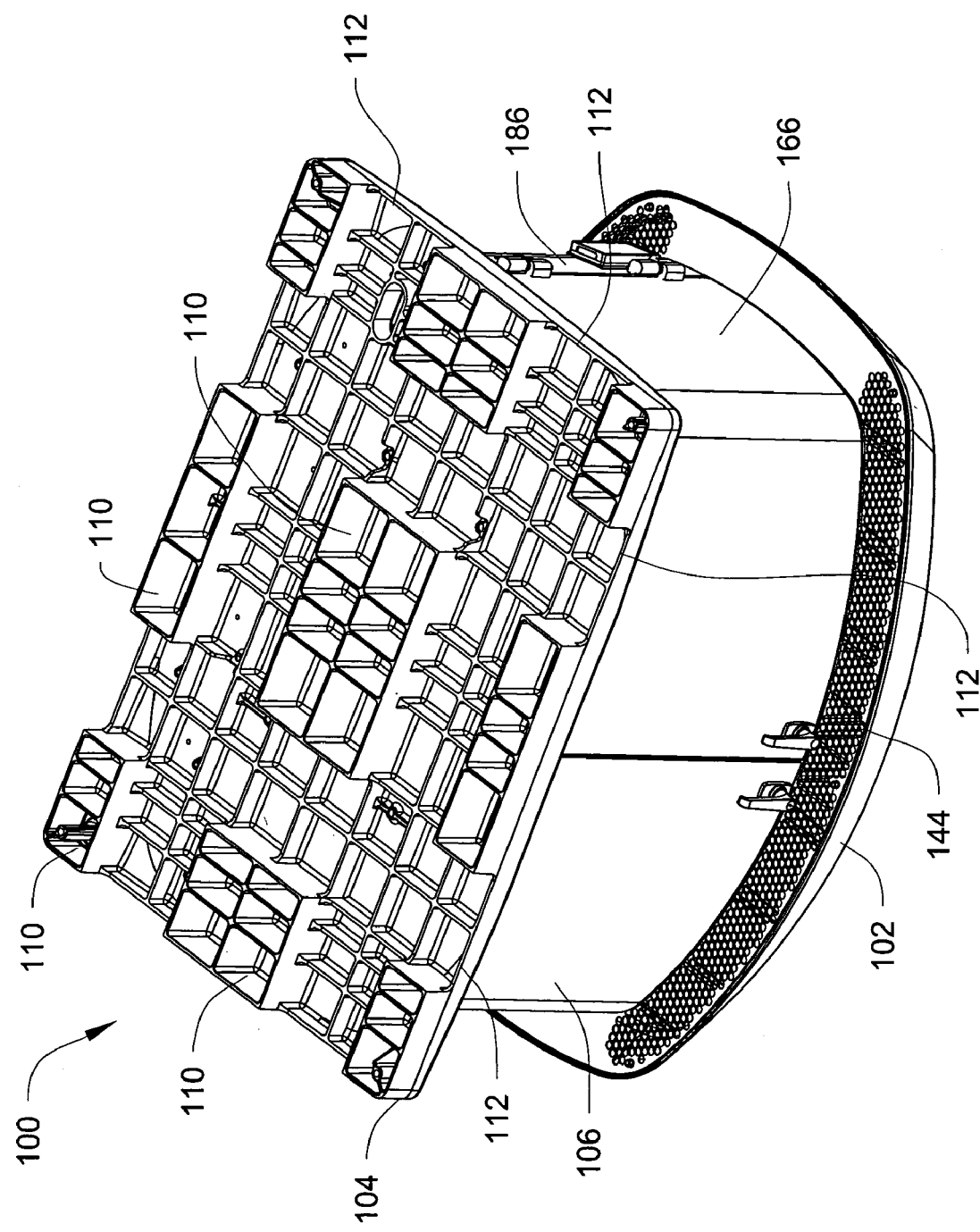
FIG. 2 illustrates a bottom frontal perspective view of the generator housing shown in FIG. 1.

The base portion 104 includes a support structure that allows the top portion 102 and the side portions 106, 166, 186 (and a generator set that may be in the housing) to be suitably supported thereon. As shown in FIGS. 2 and 4, numerous ribs throughout the underside of the base portion 104 can provide weight distribution. Further, multiple supports 110 or feet are disposed on the underside of the base portion 104. As shown, supports 110 are provided at corners, between corners proximate the edges, and at the center of the base portion 104.

The supports 110 are constructed such that they raise the overall height of the housing 100 and provide further functionality in transport, installation and/or removal. Guides 112 are disposed along the long and short sides of the base portion 104 and respectively extend from side to side and front to back. In the exemplary configuration shown, the guides 112 form channels or races that provide clearance areas to allow for transport and/or installation equipment to engage the underside of the base portion 104 and to transport the housing 100 (and a generator set that may be contained in the housing). For example, a transport and/or installation equipment may be a forklift or other suitable device.

It will be appreciated that the number and arrangement of ribs and supports are merely exemplary as more or less ribs and supports may be employed and in differing configurations. The support structure is not limited to the specific structure or configuration shown, so long as the base portion 104 can maintain its support, transport, installation, and removal functionality, and provide an ease of manufacturing assembly.

The base portion 104 may be formed of a rigid plastic material, and may be a rigid plastic material molded as an integral one piece structure. In one embodiment, the base portion 104 is a rigid polypropylene plastic. It will be appreciated that the base portion 104 may be constructed of multiple pieces if desired or necessary. It further will be appreciated that other materials may be used to construct the base portion 104, for example a suitable metal material may be used, such as steel. That is, the base portion 104 is not limited to the specific structure or configuration shown, so long as the base portion 104 can maintain its support, transport, installation, and removal functionality.

The top portion 102 may also be a rigid plastic material, such as but not limited to a polypropylene plastic, and may also be formed by molding. In one embodiment, the top portion 102 includes an ultraviolet (UV) stabilizing material for superior UV resistance and protection of the top portion 102. As some examples, the stabilizing material may be molded into the top surface of the top portion 102 or applied as a coating thereon. It will be appreciated that other materials may be used to construct the top portion 102, for example a suitable metal material may be used, such as steel.

In one exemplary embodiment, the side portions 106, 166, 186 may be constructed of an aluminum material. The side portions may also include an architectural grade powder coat material. It will be appreciated that other materials may be used to construct the side portions, for example a suitable metal material may be used, such as steel. It further will be appreciated that the materials used for constructing the top and side portions are not limited to any specific material, and that many suitable materials may be employed.

Figure 6:
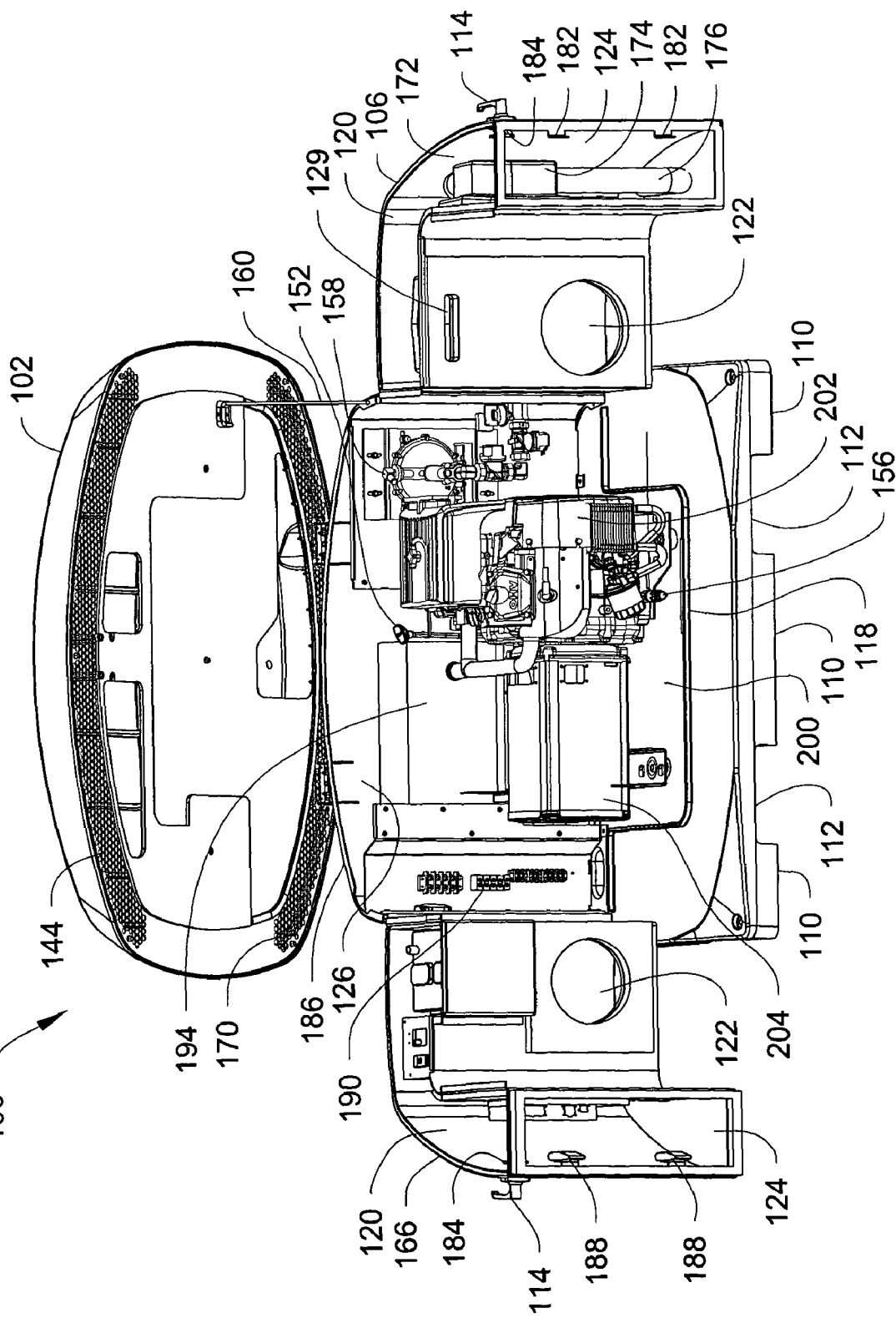
FIG. 6 illustrates another perspective view of the generator housing shown in FIG. 1 showing the generator housing in an open configuration.

FIGS. 5 and 6 illustrate perspective views of the generator housing 100, while showing the generator housing 100 in an open configuration. One embodiment of a generator 200 is shown inside the generator housing 100. Typically, the generator housing will include a generator pre-installed in the housing 100 prior to its arrival at a location for use. It will be appreciated, however, that this configuration is merely exemplary as a generator that is to be contained in the housing 100 may not be pre-installed in the housing.

FIGS. 5 and 6 show the generator housing 100 in the open configuration. The generator housing 100 shows the top portion 102 opened and two of the side portions 106, 166 opened. As described, the top portion 102 provides a cover structure that can open and close the top of the housing 100 along its long side. Likewise, the two side portions 106, 166 provide a door-like structure that can open and close the housing 100 from the right and left sides. When the top 102 and side 106, 166 portions are opened, excellent clearance and wide open access into the housing 100 is available, so that installation, service, maintenance, repairs, and/or monitoring of the generator 200 and inside the housing 100 can be accomplished.

It further will be appreciated that the top 102 and side 106, 166 portions are not limited to the specific structure shown. For example, the top portion 102 may open along the short side (i.e. right or left side) of the housing, rather than the long side if desired or necessary. As another example, the two side portions 106, 166 may be combined as a single side portion that is hinged at one of the right or left sides, and that acts as a single door-like structure, rather than two separately hinged doors. That is, the top and side portions are not limited to the specific configuration shown, so long as they may open to provide clearance and access to the generator 200 and the inside of the housing 100.

The open configuration allows for convenient access to the inside of the housing and excellent clearance in performing any necessary installation, service, maintenance and/or repairs on the generator 200. The generator 200, which includes an engine 202 and an alternator 204, resides within the enclosure created by the top 102, sides 106, 166, 186, and base 104 portions.

A locating rib 118 is disposed on the top surface of the base portion 104. In one embodiment, the locating rib 118 facilitates locating of the two side portions 106 and sealing with the side portions 106 to seal the interior space, when the housing 100 is to be in the closed configuration. The main components of the generator 200, for example the engine 202 and alternator 204, reside within an interior space defined by a perimeter or lining created by the locating rib 118. In one embodiment, the locating rib 118 may be constructed of the same material as the base portion 104. However, it will be appreciated that the locating rib 118 may be constructed of a material different from the base portion if desired.

As shown in FIG. 5, a terminal block cover 150 is disposed rearward and leftward inside the housing 100. The terminal block cover 150 covers terminal strips 190 (shown in FIG. 6) of the generator 200, and is accessible when the housing 100 is open. The side portion 166 on the side where the terminal block cover 150 is located may be rotated to swing away from the inside of the housing and allow for wide open access of the terminal block cover 150, so that the terminal block cover 150 can be easily removed and the terminal strips 190 accessed. It will be appreciated that the side portion 166 can also be lifted off the hinges 116 for additional access. In this manner, the terminal block cover 150 can be removed to access the terminal strips 190, for example by removing a number of screws or bolts (usually two or three). As shown in FIG. 5, the side portion 166 is partly rotated, and it will be appreciated that the side portion 106 may be rotated further, such as at least 90° and higher to provide wide open access (as shown in FIG. 6 for example).

Likewise, the side portion 106 on the rightward side of the housing is shown partly rotated and it will be appreciated that this side portion 106 may also be rotated further, such as at least 90° and higher to provide wide open access. It will also be appreciated that the side portion 106 on the right side of the housing can also be lifted off hinges 116 for additional access. A fuel system assembly 158 comprised of a regulator, safety shutoff valve, and pressure switch is shown rearward and rightward inside the housing 100. The fuel pressure switch (component of 158) can alert a user when fuel pressure is insufficient or too low. As with the terminal block cover 150, the fuel pressure system assembly 158 is accessible when the housing 100 is open. Connection to the fuel system assembly 158 is easily accomplished from the outside of the housing. A hole 192 proximate the hinge 116, such as shown in FIG. 4, may be employed to allow fuel connection access. It will be appreciated that the structure and configuration of the hole 192 are merely exemplary and may be modified as necessary and suitable.

The open configuration of the housing 100 provides further benefits, for example, in changing the lubrication oil of the generator 200. A dip stick 152, an oil fill cap 154, and an oil drain plug 156 provide convenient mechanisms for checking and changing the lubrication oil without the need for tools to access these features. When the housing 100 is in the open configuration, significant clearance is provided in order to perform such maintenance procedures.

A prop rod 160 may be provided to hold the top portion 102 in the open configuration. The prop rod 160 can be connected to either the top portion or one of the side portions, and can be positioned as a prop or support leg against the other of the top portion of one of the side portions. In such an exemplary structure, the prop rod 160 would hold the top portion 102 in the open configuration. It will be appreciated that a prop rod may not be used, as the hinges 168 may be constructed as spring loaded hinges or hydraulic lift hinges.

Turning back to the side portions 106, 166, the side portions 106, 166 include a flow structure that allows for air intake from outside the housing 100 to the inside, and that allows for the release of exhaust and cooling air from inside the housing 100 to the outside. In one embodiment, the flow structure includes chambers built or formed within the side portion structure.

Figure 7:
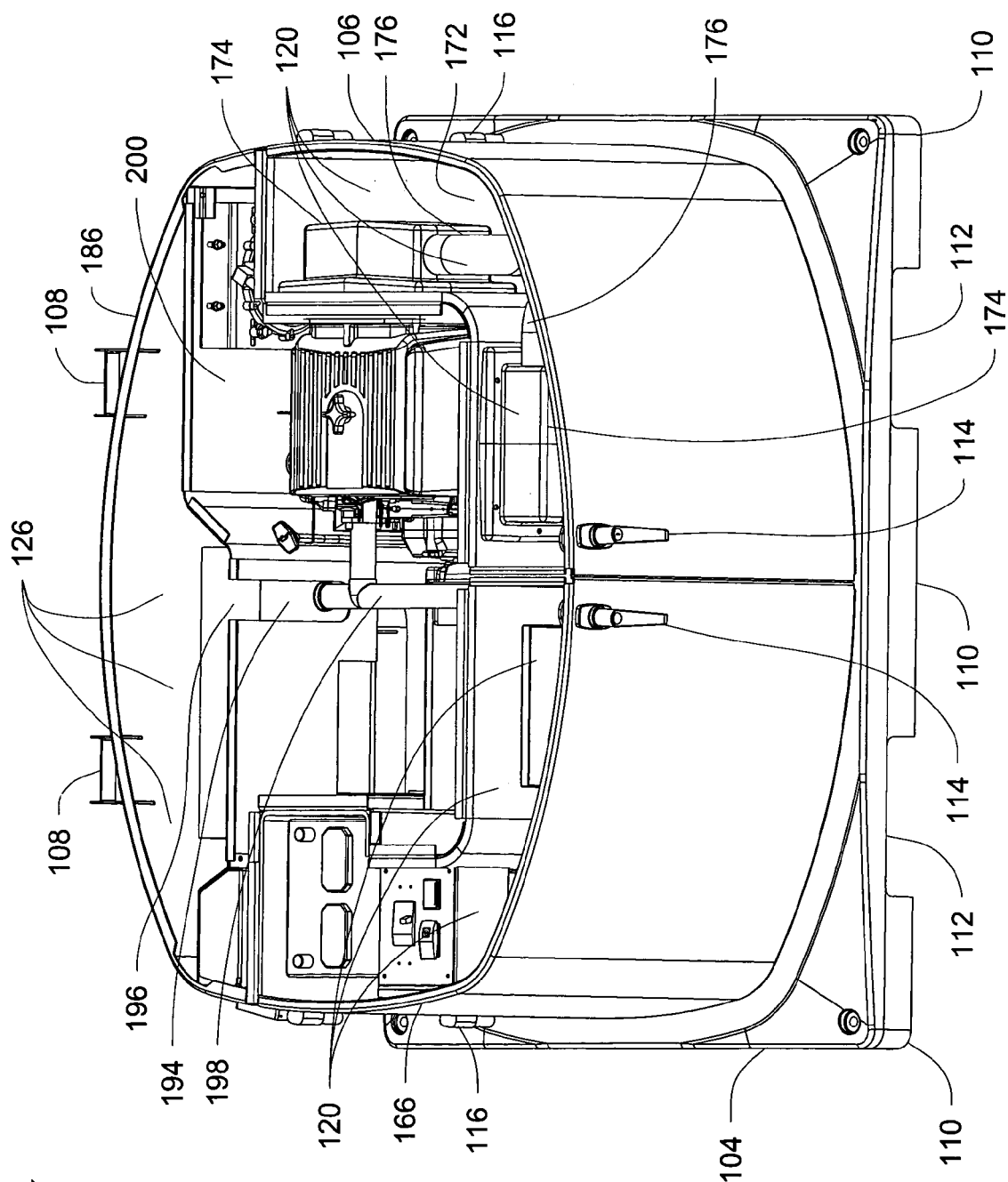
FIG. 7 illustrates a top perspective view of the generator housing shown in FIG. 1 and the generator shown in FIG. 5, while showing a top portion of the generator housing removed.

As best shown in FIGS. 5-7, air intake chambers 120 are disposed within the side portions 106, 166 (i.e. doors). In one embodiment, the chambers 120 are hollowed out spaces that allow intake air to flow into the side portions 106, 166. As shown, the chambers 120 are built in the side portions 106, 166, so as to generally contour the shape of the side portions 106, 166, and to be consistent with the exterior perimeter of the housing 100. The contour of the chambers 120 can aide in smoothly guiding airflow, while providing an overall pleasing aesthetic appearance of the housing 100. When the housing 100 is closed, an opening 124 at the end of each chamber 120 allows air to flow between the chambers 120 of each side portion 106, 166.

Openings 122 allow air to flow into the interior space of the housing 100 and the main components of generator 200, when the side portions 106, 166 are closed. The air flow through the openings 124 provides cooling air to the generator 200, and namely to the engine 202 and the alternator 204. The opening 122 on the left side is shown as a circular opening on the alternator side of the generator 200, while the opening 122 on the right side is also shown as a circular opening (not fully shown) on the engine side of the generator 200. In one embodiment, the opening 122 on the left side provides cooling air to the alternator 204 and the opening 122 on the right side provides cooling air to the engine 202. An opening 129 is provided on side portion 106 to allow for combustion air to enter the engine side.

It will be appreciated that the openings 122, 124, 129 are not limited to the specific shape and size as shown, and may be modified as desired and/or necessary to allow a suitable intake flow of air from the chambers 120. Likewise, the chambers 120 are not limited to the specific configuration as shown, so long as the side portions 106, 166 include a chamber structure therein that receives intake air and allows it to flow as cooling and combustion air to the generator components.

In one embodiment of operation, intake air is pulled through the alternator 204 and engine 202 by their cooling fans, and overall by the engine combustion intake process. The intake air flows to the alternator 204 and engine 202 as described. The cooling fans discharge hot cooling air into the interior space and into the backside of the housing (i.e. inside chamber 126 of side portion 186), such as through opening 196. Exhaust air generated by the engine 202 is discharged through the exhaust pipe 198, and into the muffler 194 at the backside of the housing 100. In one embodiment, the muffler 194 is disposed within the rear side portion 186, such as inside chamber 126, which is further described below.

Chamber 126 is disposed within the rear side portion 106. The rear side portion 186 is receivable of exhaust released from the engine 202 through the exhaust pipe 198 into the rear chamber 126. As with chambers 120, chamber 126 is built in the rear side portion 186, so as to generally contour its shape and be consistent with the exterior perimeter of the housing 100. Likewise, chamber 126 is not limited to the specific configuration shown, so long as the rear side portion 106 includes a chamber structure therein that receives exhaust air created by the generator 200 and air within the interior space.

The flow structure of the side portions 106 provides a cooling function for the generator 200, for example, by allowing intake air to flow into the housing 100 and cool the engine 202 and alternator 204. The flow structure also provides sufficient combustion air to the engine. The flow structure of the side portions 106 cooperates with a flow structure of the top portion 102, which is shown in FIGS. 5-6 and is further explained with respect to FIGS. 8 and 9 below.

FIGS. 8 and 9 respectively illustrate perspective and exploded views of the top portion 102. In one embodiment, the flow structure of the top portion 102 provides the initial entry of intake air into the housing 100 and the subsequent release of cooling and exhaust air out of the housing 100. The top portion 102 includes a main body 130. The top portion includes an air intake chamber 140 and an exhaust and air release chamber 142, which will be further detailed below. In one embodiment, the main body 130 is provided with a top exterior surface area that is larger than the perimeter taken up by the side portions 106. That is, the main body 130 provides a top portion 102 that resembles an overhanging cover. This exemplary configuration can provide added protection for the overall housing and a generator that may be contained therein. The overhanging structure also allows for a generator to continue operation in a variety of weather conditions, such as in the presence of high snow drifts. In another embodiment, the main body includes an overcurve profile that can, for example, allow for moisture run off.

The release chamber 142 includes an insulator 132. The insulator 132 can insulate the main body 130 from high exhaust temperatures created by the generator 200, thereby helping to cool exhaust air. As shown, support ribs within the release chamber 142 can create air pockets between the surface of the main body 130 and the insulator 132, which can further insulate the surface of the main body 130 from high exhaust temperatures.

A plate 134 is connected to the main body 130. The plate 134 includes multiple openings that facilitate the flow of intake air into the housing 100 and the flow of exhaust and air out of the housing 100. As shown, the plate 134 includes openings 144 disposed on a section of the plate 134 that would overhang the perimeter of the side portions 106, 166. The openings 144 allow for intake air to be received into the air intake chamber 140. In one embodiment, the openings 144 are small pores or apertures configured as a screen-like layout. In this exemplary configuration, the openings 144 can prevent for example, entry of debris, insects, and/or small rodents or animals.

Once intake air enters through the openings 144, it is allowed to flow through the air intake chamber 140, through the openings 146, and into the chambers 120 of the side portions 106, 166 (above). As discussed, once the intake air enters the chambers 120 of the side portions 106, 166, air can then flow into the interior space of the housing to cool the generator 200 components and provide combustion air for the engine. In one exemplary configuration, openings 144 are arranged and configured so that intake air enters along the long side of the housing 100. As described, a cooling fan of the alternator 204 can draw air through the side portion 166 (i.e. left door). A cooling fan of the engine 202 can draw air through the side portion 106 (i.e. right door). Engine combustion air may also be drawn through the side portion through the opening 129 or oval shaped cutout disposed proximate the top of the side portion 106.

The plate 134 includes openings 170 disposed on a section of the plate 134 that would overhang the perimeter of the rear side portion 186. The openings 170 allow for the release of exhaust and air that is received in the release chamber 142. In one embodiment, the openings 170 are small pores or apertures configured as a screen-like layout. As with openings 144, the openings 170 can prevent for example, entry of debris, insects, and/or small rodents or animals.

In operation, exhaust and air are released from the generator 200 into the chamber 126 at the rear side portion 186. Once exhaust and air are released into the chamber 126, it is allowed to flow into the release chamber 142 through opening 148. From the release chamber 142, exhaust and air can then flow out of the openings 170. In one exemplary configuration, exhaust and air releases along the long side of the housing 100. In such a configuration, exhaust and air can be discharged away from a nearby structure, such as the side of a home, where the housing 100 has the front side facing towards the home. This configuration is beneficial compared to traditional enclosures, which intake and exhaust air from the short sides of a housing, in that the housing 100 can be placed much closer to another structure, such as the side of a home.

The flow structures of the top portion 102 and side portions 106 provide a cooling effect inside the housing to cool a generator that may be contained therein. The flow structures also provide a noise attenuating feature, by directing flow of intake air and exhaust along a particular path, while using a chamber structure formed within the top and side portions. The long, directed flow path and the multiple volumes created by the chamber structures facilitate the reduction of noise, such as when a generator may be in use.

In another embodiment, the overall chamber structure of the housing 100 may be further coupled with an intake resonator 172 to provide a noise reduction function. As best shown in FIGS. 6-7, the side portion 106 (i.e. right side door) illustrates one embodiment of an intake resonator 172. The exemplary intake resonator 172 includes resonator components 174 and attached hoses 176. The intake resonator may be connected at the opening 129 so that intake of combustion air flows through the intake resonator to the engine 202. In such an exemplary configuration, the design of the housing 100 can further reduce the combustion air intake noise from the engine 202.

A plate liner 136 and a rib liner 138 are connected to the plate 134. The plate liner 134 provides a ridge 133 that further facilitates sealing and locating of the top portion 102 to the side portions 106, 166. In one embodiment, the ridge 133 of the plate liner 136 contours the top of the side portions 106, 166. The plate liner includes openings 146a in fluid communication with openings 146. In one embodiment, the openings 146a have substantially the same shape as openings 146. Rib liner 138 provides a ridge or rib-like structure to provide sealing and locating functions between the top portion 102 and the rear side portion 186. In one embodiment only, screws and bolts 131 may be used to connect the main body 130, insulator 132, plate 134, plate liner 136, and rib liner 138. It will be appreciated, however, that such structures are exemplary only as others may be suitably employed.

Figure 10:
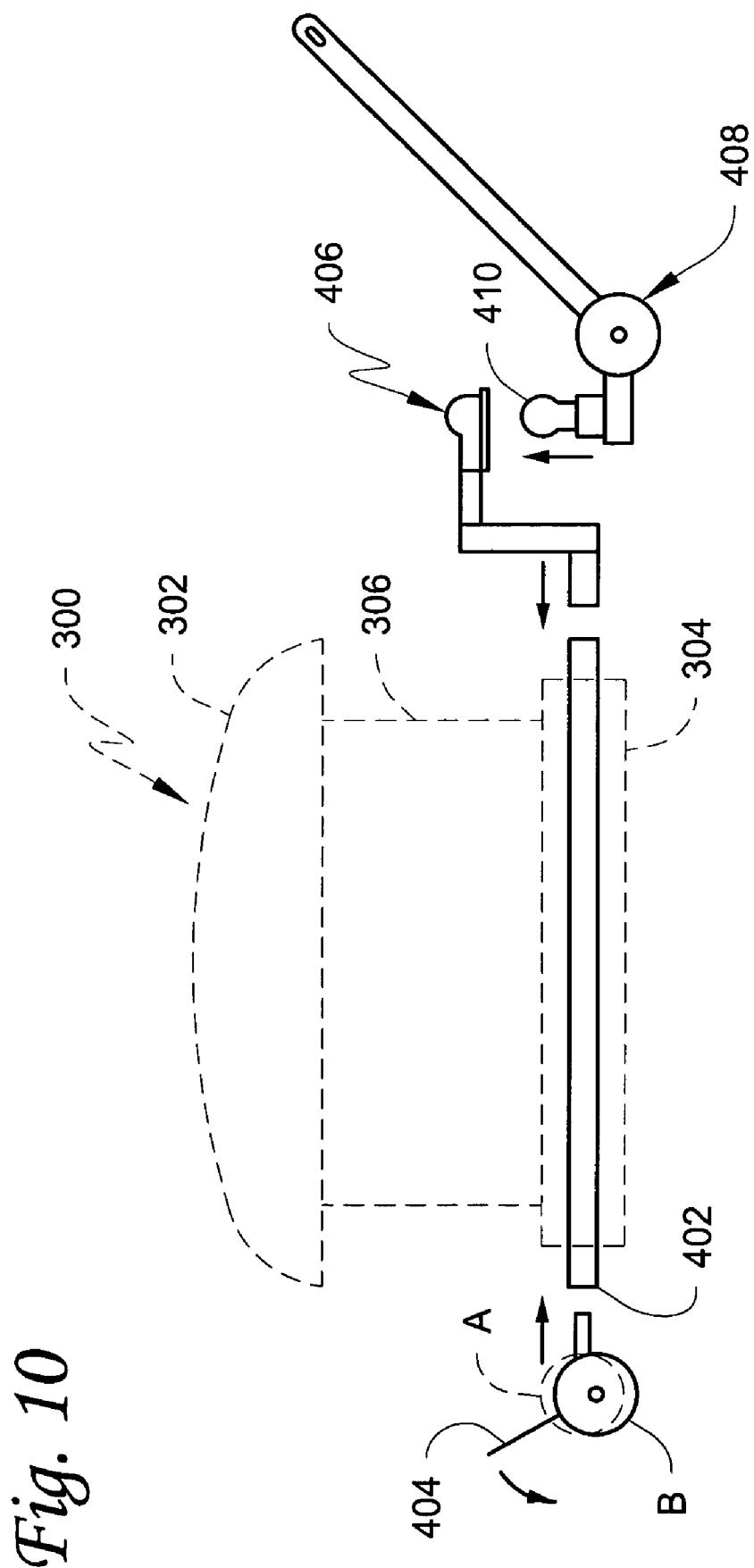
FIG. 10 illustrates a schematic view of one embodiment of equipment for transporting a generator housing.
Figure 11:
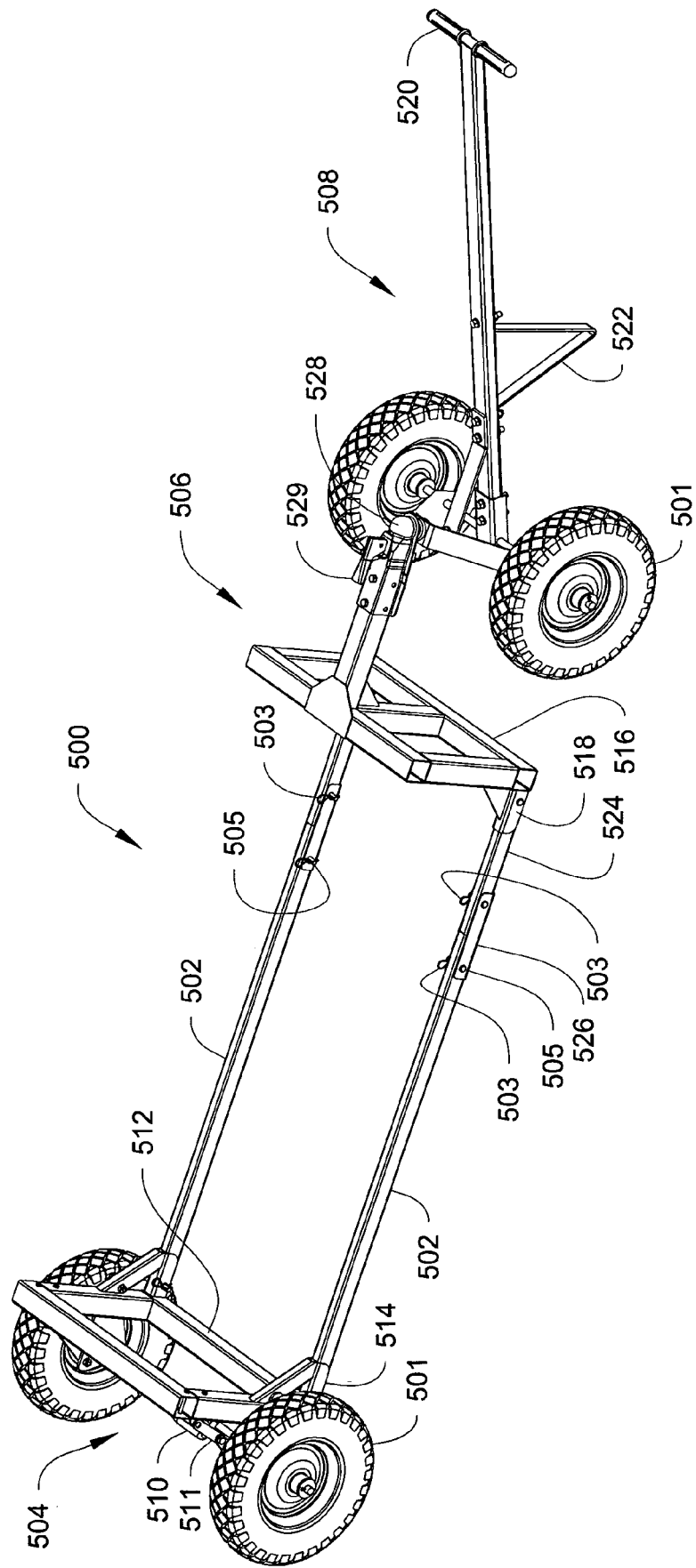
FIG. 11 illustrates a perspective view of another embodiment of transport equipment.
Figure 12:
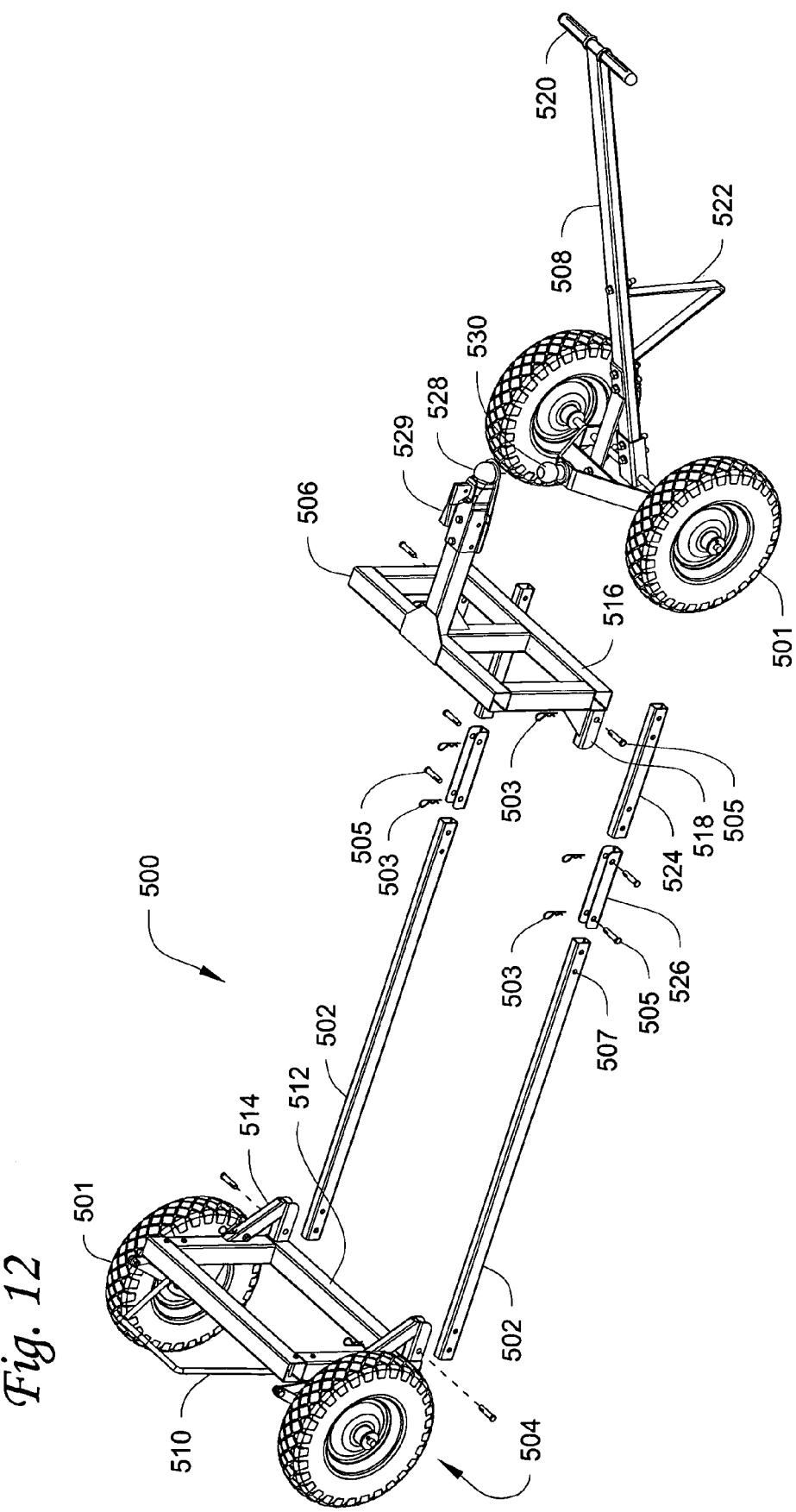
FIG. 12 illustrates an exploded perspective view of the transport equipment of FIG. 11.

FIG. 10 illustrates a schematic view of one embodiment of equipment 400 for transporting a generator housing 300 (and a generator set such as 200 that may be contained therein). As with housing 100, generator housing 300 similarly includes a top portion 302, a base portion 304, and a side portion 306. It will be appreciated that the equipment 400 may be employed with any of the generator housing concepts described, including the described generator housing 100. The equipment 400 includes a pair of tubes 402 that can slide under the base portion 304 of the generator housing 300. As with the base portion 104 of housing 100, base portion 304 would include a similar channel structure for the tubes 402 to engage the base portion 304 and between the supports.

FIG. 10 shows one tube 402. It will be appreciated that two tubes may be provided to engage the channels provided on the base portion 304 to adequately support the housing 300.

A levered wheel mechanism 404 is connected to the tubes 402 at one end. The levered wheel mechanism 404 may be changed between a setup position A and a roll position B to respectively deactivate/activate the wheels of the mechanism 404.

A trailer hitch 406 is provided that can connect to the other end of the tubes that the levered wheel mechanism 404 is not connected. After the trailer hitch is connected, the levered wheel mechanism 404 may be activated to the roll position A. A trailer or trailer dolley 408 having a ball 410 can then be connected to the hitch 406. Once the ball 410 is securely engaged with the trailer hitch 406, a user can lift the end of the hitch and roll the generator housing 300 (and a generator that may be inside) to a desired location.

The transport equipment 400, when coupled with the base portion 304 structure of the housing 300, can provide ease of installation, removal, and/or transport. That is, installation, removal, and/or transport procedures require less time and effort, and may be achieved by a single person. It will be appreciated that the transport equipment 400 is not limited to the specific structure shown, and that the transport equipment 400 may be modified as suitable or necessary, so long as a transport equipment is provided that can cooperate with the base portion structure provided on a generator housing as described.

FIGS. 11-16 show another embodiment for a transport equipment 500. The transport equipment 500 includes similar concepts as transport equipment 400 and with further features and detail described below.

Generally, the transport equipment 500 is useful for transporting a generator housing and any generator that may be contained therein. The transport equipment 500 provides features that can allow for its convenient assembly and for the convenient transport of a generator housing and generator set, for purposes of either installation or removal. It will be appreciated that the transport equipment 500 may be employed to transport any of the generator housings and generators described, including for example the generator housings 100, 300 and the generators that may be contained therein.

The transport equipment 500 features described herein can allow a single person, such as an individual home user or individual installer, to alone assemble the transport equipment 500 and alone transport a generator housing and generator set. Many home standby generator sets are large and heavy, and typically require more than one person to handle the transporting and installation/removal tasks, and/or may require more complex equipment such as a forklift. The transport equipment 500 includes features that can allow for its convenient assembly on surfaces other than traditional flat, hard floors, such as pavement, and for transport of a load on such other surfaces. Such other surfaces may include lawn and turf and off-road surfaces, where access by other transport equipment (i.e. forklift) may not be ideal and where such conditions for transporting may otherwise be less than ideal.

More generally, the transport equipment 500 provides features that may be ideal for transporting items that are not a generator housing/generator set. For example, the transport equipment 500 may be useful for transporting generally large pallets or skids, having various materials loaded thereon. As some examples, such pallets may contain building and construction materials, lawn and garden materials, and other materials and goods that may need a pallet for stability and support.

The transport equipment 500 includes supports 502 that connect to a lift assembly 504 at one end of the supports 502 and that connect to a coupler assembly 506 at the other end of the supports 502. The supports 502 generally are elongated members. In the exemplary embodiment shown, there are two supports 502 that generally are long tubular bars having a rectangular shaped cross-section. The supports 502 are configured so that they may slide underneath the base portion of a generator housing, such as the generator housings described above. The supports 502 may slide under the channel and race structure of the generator housing's base portion to allow the supports 502 to engage the base portion. In such a configuration, the generator housing and generator set at its base portion can stably rest on the supports 502. While two supports 502 are shown, more than two supports 502 may be employed if desired and/or necessary.

Similar to the levered wheel assembly 404 of mechanism 400, the lift assembly 504 may be connected and disconnected to one end of the supports 502. The lift assembly 504 includes a frame 512 and wheels 501. The frame 512 includes connector portions 514. The connector portions 514 connect the lift assembly 504 to the supports 502. In one embodiment, the connector portions 514 are u-shaped bar portions that allow the supports 502 to connect inside the u-shape of the connector portions 514. In one embodiment, the u-shaped portions are downward facing so there is no need to lift the support members 502 off the ground to connect them to the lift assembly 504. The connector portions 514 and supports have holes 507 where various pins, bolts, and screws may be employed to connect the connector portions 514 to the supports. As shown, clevis pins 505 and retainers 503 may be employed in one embodiment to connect the supports 502 to the connector portions 514. It will be appreciated that the particular configuration and components used for connecting and disconnecting the connector portions 514 to the supports 502 is not limited to the specific structure shown. Other equally or more suitable connecting structures and configurations can be employed as may be known in the art. It will also be appreciated that the connector portions 514 and supports 502 may be in a disconnected state, such as before and after the transport equipment 500 has been used.

Figure 15:
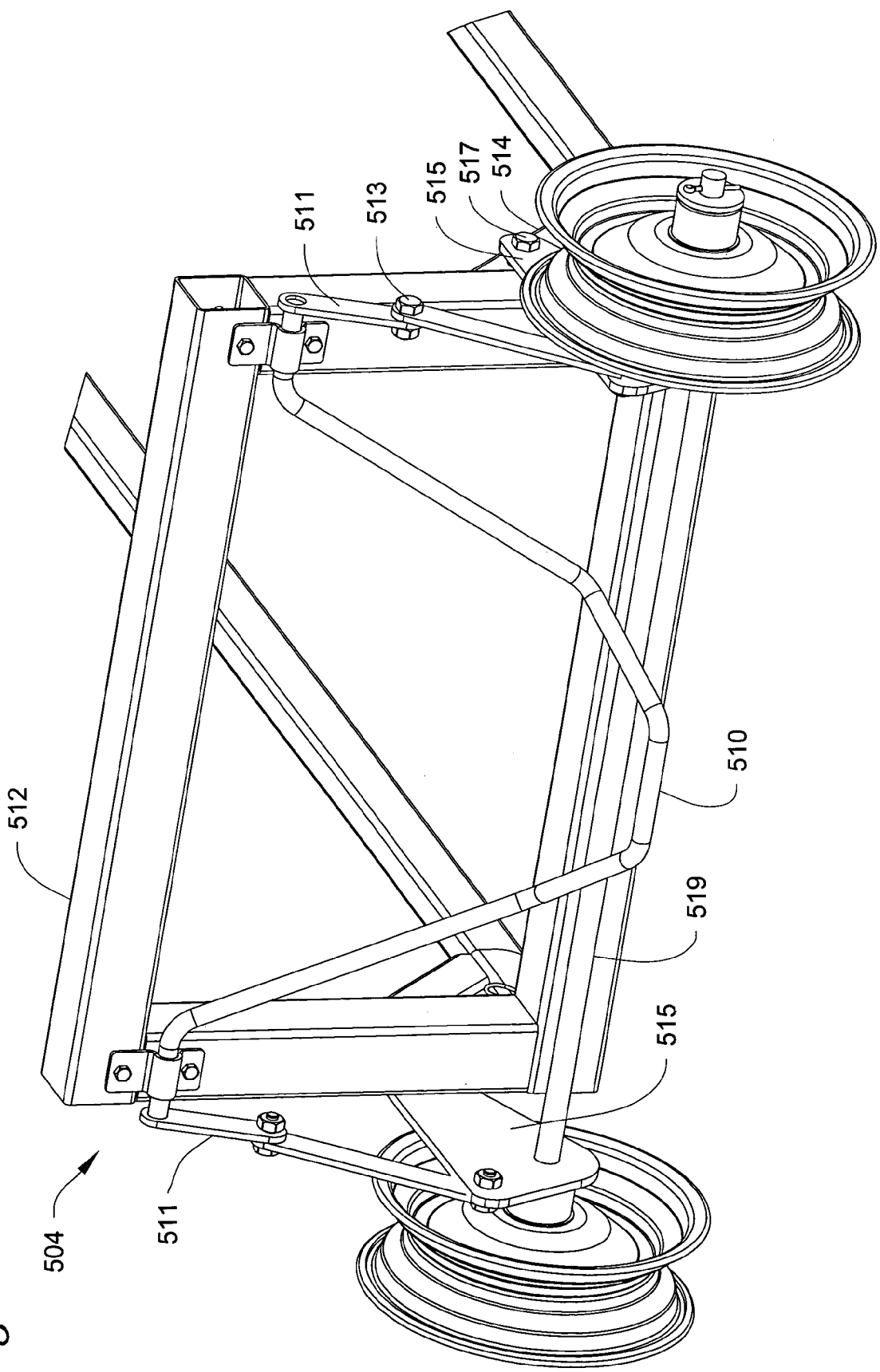
FIG. 15 illustrates a partial rear perspective view of one embodiment of a lift assembly for the transport equipment of FIG. 11. The lift assembly is shown in one embodiment of a lifted position.
Figure 16:
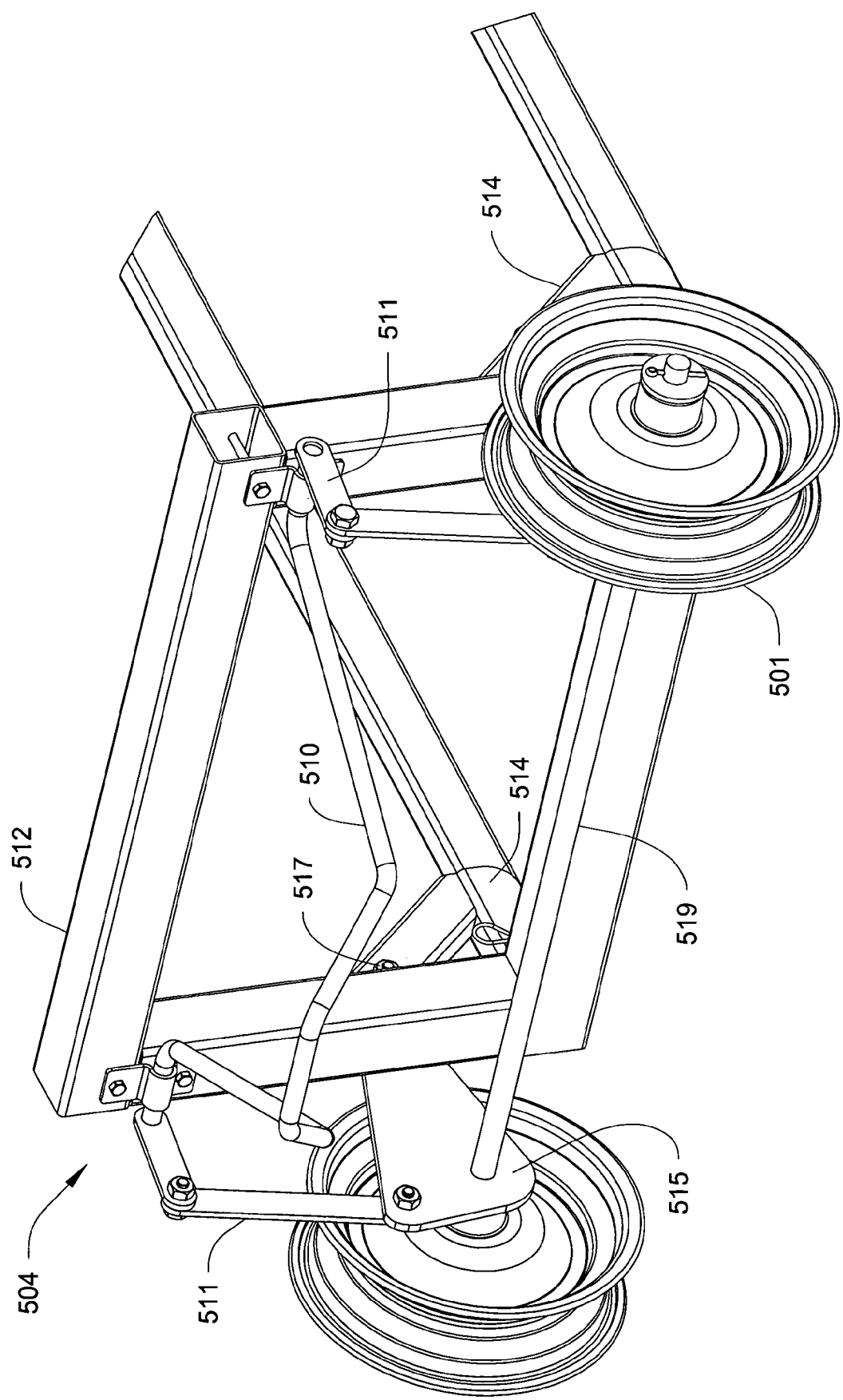
FIG. 16 illustrates a partial rear perspective view of the lift assembly of FIG. 15. The lift assembly is shown in one embodiment of a non-lifted position.

The transport equipment 500 includes a transport position as shown in FIG. 15 and an assembly or non-transport position as shown in FIG. 16 when the lift assembly 504 is respectively activated/deactivated. The lift assembly 504 includes a lever mechanism for activating/deactivating the lift assembly 504. As shown in FIGS. 15 and 16, the lever mechanism in one example may be a four-bar construction. The lever mechanism includes a lever 510 connected to an arm assembly 511 on each side of the frame 512.

As shown, when the lever 510 is pushed or moved generally downward, arm assemblies 511 are moved into a generally upright and locked position. The arm assemblies 511 each include a pivot point 513 and are pivotable around the pivot point 513 toward the generally upright and locked position (FIG. 15). The arm assemblies 513 also are pivotable around the pivot point 513 toward a generally bent position (FIG. 16). As shown, the lever 510 is rotatably connected to the frame 512 such as by collars, and where the frame 512 may serve as a ground for the lever mechanism. Each arm assembly 511 is connected to a load transfer arm 515. The load transfer arms 515 are connected on the frame 512 at connector portions 514 and are pivotable around pivot point 517. When the lever 510 is positioned generally downward so that the arm assemblies 511 are in the generally upright and locked position, load transfer arms 515 may pivot upward with respect to the connector portions 514 and around the pivot point 517. In such a configuration, a load on the supports 502 may be transferred to the wheels 501 (tires not shown in FIGS. 15 and 16) and axle 519. Pivot action by the load transfer arms 515 imparts movement of the axle 519 and wheels 501 toward the frame 512 to shift the distribution of any load carried by the supports 502 onto the axle 519 and wheels 501.

Regarding a locking function of the lift assembly 504, the lift assembly 504 can provide lock-in-place functionality resulting from the construction of the lever mechanism. As shown, the lift assembly 504 is locked when the arm assemblies 513 are in the generally upright position. More particularly, each arm assembly 513 is in a slightly offset position where the pivot point 513 extends slightly inwardly toward the frame 512 and relative to the arms of its respective arm assembly 513. In such a position, the relative arms of each arm assembly 513 have passed an over-center position, such that no mechanical advantage exists that would inadvertently or otherwise move or kick the arm assembly 513 out of the generally upright position (i.e. to the bent position) without a significant amount of force. The construction of the lever 510 may also be such that in its downward position, the axle 519 prevents further movement of the lever 510 toward the frame 512. In such a configuration, the top arm of each arm assembly 513 would not over rotate past the slightly offset position and in the other direction away from the frame 512.

In operation, when the arm assemblies 511 are in the generally upright and locked position, the frame 512 is raised upward off the ground, and when the arm assembly is in the bent position the frame 512 is lowered downward to the ground. The transport equipment 500 is activated in the transport position when the frame 512 is raised upward. When the frame 512 is raised upward, the supports 502 connected to the connector portions 514 of the frame 512 are raised, and which also raises a load that the supports 502 may have been positioned under. In such a configuration, an individual may lift a load that the supports 502 have been disposed under.

The transport equipment 500 may be deactivated when the frame 512 is lowered downward. In the downward configuration, a user may connect the supports 502 when assembling the transport equipment 500 to transport a load, or may disconnect the supports 502 when the transport equipment 500 is not to be used. It will be appreciated that the lift assembly 504 is not limited to the specific structure as shown, and may be constructed and arranged using a variety of structures as may be known in the art, as long as the lift assembly 504 can connect to the supports 502 and lift the supports 502 off the ground to thereby raise a load off the ground.

The transport equipment 500 further includes a coupler assembly 506. The coupler assembly 506 may be connected and disconnected to the other end of the supports 502. The coupler assembly 506 includes a frame 516 having connector portions 518, a hitch 528 and a lock 529.

The connector portions 518 include holes 507 which may be used to connect and disconnect the connector portions 518 to the supports 502. As with the connector portions 514, the connector portions 518 may be u-shaped portions that allow the supports 502 to connect inside the u-shape of the connector portions 518. In one embodiment, the u-shaped portions are downward facing so there is no need to lift the support members 502 off the ground to connect them to the coupler assembly 506. As with the lift assembly 504, various pins, bolts, and screws may be employed to connect/disconnect the supports 502 to the connector portions 518. Clevis pins 505 and retainers 503 may be employed in one embodiment to connect/disconnect the supports 502 to the connector portions 518. It will be appreciated that the specific configuration and components used to connect and disconnect the connector portions 518 to the supports 502 is not limited to the specific structure shown. Other equally or more suitable connecting structures and configurations may be employed as may be known in the art.

As shown, extension members 524 may be used to connect the supports 502 to the connector portions 518. In one embodiment, the extension members 524 are similar to the supports 502 in that they may be generally tubular bars having a rectangular shaped cross-section. When the extension members 524 are used they may act as lengthwise extensions for the transport mechanism 500 to increase the length dimension of the entire assembly. In an exemplary application of their use, the extension members 524 can extend the length of the supports 502 so that the long dimension of a generator housing may be accommodated, for example the side to side dimension of generator housing 100 shown and described above. In such a transport configuration, a generator housing and generator may reside substantially within the width or sides of the transport equipment 500 (i.e. from support 502 to support 502), which may allow for easier clearance through relatively narrow areas.

Coupler members 526 may be employed to connect the extension members 524 to the supports 502. The coupler members 526 may be u-shaped portions that allow the supports 502 and extension members 524 to connect inside the u-shape of the coupler members 526. As with connecting the lift assembly 504 and coupler assembly 506, the coupler members 526 may include holes 507, where various pins, bolts and/or screws may be employed to connect the components together (i.e. clevis pins 505 and retainers 503).

It will be appreciated that extension members 524 and coupler members 526 may not be employed. In such a configuration, the supports 502 may be directly connected to the coupler assembly 506 at the connector portions 518. When the extension members 524 are not employed, the transport equipment 500 may have a shorter wheel base thereby reducing its turn radius. In such a configuration, a load may be easier to move and to transport to its desired location. For example, when the load is a generator housing and generator as described herein, the transport equipment 500 may accommodate the generator housing (and generator contained therein) along its short dimension or width, for example the front to back dimension of generator housing 100 shown and described above.

The hitch 528 extends generally frontward from the frame 516 and may connect to a dolly 508. The dolly 508 includes a ball 530 that can engage with the hitch 528 in a general ball and hitch connection. As shown, a lock 529 may be employed to lock and unlock the ball 530 of the dolly 508 and the hitch 528 together. As one example, the lock 529 may be a latch lock as may be known in the art and may be used in ball and hitch connections. As with the lift assembly 504, the dolly 508 includes wheels 501 for moving the transport equipment 500. The dolly also includes a handle 520 which may be employed to steer and pull/push the transport equipment 500. As shown, a stand 522 may be provided on the dolly 508 for holding the dolly in a generally upright position.

To assemble the transport equipment 500 with a load (i.e. home standby generator set), a user may slide the supports 502 underneath a load supported by a base having a channel or race structure. In one preferred example, such a load is a generator housing and generator supported by a base portion as described herein. In some examples, the load may not be a generator housing and generator, and instead may be a general pallet of materials or goods. The coupler assembly 506 may then be connected to one end of the supports 502 by connecting the coupler assembly 506 directly to the supports 502 or by connecting the coupler assembly 506 to the supports 502 through the extension members 524. In one example, the extension members 524 may first be connected with the supports 502, and then sliding both the supports 502 and the extension members 524 underneath the load before connecting to the coupler assembly 506. The lift assembly 504 may then be connected to the other end of the supports 502. The dolly 508 may then be connected to the hitch 528 and the lock 529 can activated into a locking position. It will be appreciated that the lift assembly 504 may first be connected to the supports 502 before the coupler assembly 506.

To put the transport equipment 500 into a transport position, the lever 510 may be activated to raise the frame 512 and in turn raise the supports 502 and its load off the ground. As shown, the lever 510 is moved downward to position the arm assemblies 511 into a generally upright and locked position. The arm assemblies 511 are pivotable around pivot points 513, such that downward movement of the lever 510 imparts movement on the arm assemblies 511 into the generally upright and locked position. This raises the frame 512, the supports 502, and the load. To put the transport equipment 500 into an assembly position or non-transport position, the lever 510 may be moved upward to position the arm assemblies 511 into a generally bent position. Upward movement of the lever 510 imparts movement on the arm assemblies 511 into the generally bent position, which lower the frame 512 and in turn lowers the supports 502 and its load.

As shown, the supports 502 and the frames 512, 516 of the lift assembly 504 and coupler assembly 506 may be assembled into a box-like carriage. Front and back ends of a load may be secured by the height of the front and back ends of the frames 512, 516. The load may be further stabilized on the supports 502 in a width direction, such as when the load rest on the supports 502. For example, the channel and race structure of a base portion of generator housing may rest on the supports and be stabilized from sliding side to side. In an example of transporting a generator housing and generator set, the transport equipment may at least accommodate the channel and race structure of the base portion in the width (short) direction, such as when the extension members and coupling members are not used. When the extension members and coupling members are used, then the length (long) direction of the generator housing and generator set.

The features of the transport equipment 500 can provide ease of installation, removal, and/or transport of a load. As one preferred, example such a load is a generator housing and generator as described herein. That is, installation, removal, and/or transport procedures of generator housing and generator set require less time and effort, and may be achieved by a single person. It will be appreciated that the transport equipment 500 is not limited to the specific structure shown, and that the transport equipment 500 may be modified as suitable or necessary.

It further will be appreciated that any or all of the housing and transport concepts described herein may be combined for use in a single generator housing, or may be individually employed with existing generator housing units, such as by retrofitting an existing generator housing to take advantage of any of the described concepts.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A generator housing comprising:
   a top portion;
   a plurality of side portions; and
   a base portion,
   the top, side, and base portions form an enclosure about an interior space for housing a generator therein,
   the top portion is rotatable connected to one of the side portions, such that the top portion is rotatable away from the interior space, at least one of the side portions is rotatable with respect to another side portion, such that the rotatable side portion is rotatable away from the interior space, the rotatable top portion and the rotatable side portion provide access inside the housing when rotated away from the interior space,
   the top and side portions include a flow structure that facilitates intake and release of air, the flow structure comprising flow chambers built within the top and side portions, the flow chambers direct air to flow into and throughout the housing and direct air and exhaust to flow out of the housing,
   wherein the flow structure provides cooling air inside the housing, provides a sound attenuation function, and releases air from inside the housing.

2. The generator housing according to claim 1, wherein at least one of the side portions is rotatable with respect to another side portion at least 90° to open the housing and provide wide open access to the interior space.

3. The generator housing according to claim 1, wherein the top portion and side portions are connected by hinge connections, such that at least one of the top portion and side portions are removable by lifting out of the hinge connection.

4. The generator housing according to claim 1, wherein the base portion comprises an underside, the underside is configured and arranged as a support structure having multiple feet, the multiple feet are configured to raise a height of the housing.

5. The generator housing according to claim 4, wherein the support structure includes guides that form channels with clearance areas, the guides are configured for cooperating with a transport equipment so as to facilitate ease of manufacturing assembly, transport, and installation.

6. The generator housing according to claim 5, wherein the guides extend from side to side and front to back.

7. The generator housing according to claim 1, wherein the base portion has a top surface area that is larger than a perimeter taken up by the side portions.

8. The generator housing according to claim 1, further comprising a locating rib disposed on a top surface of the base portion, the locating rib configured to locate and seal with the side portions to seal the interior space, and a plate liner and rib liner disposed on an underside of the top portion, the plate liner and rib liner configured to locate the flow chambers of the side portions and to seal the top portion with the side portions.

9. The generator housing according to claim 1, wherein the flow chambers of the side portions comprise hollowed out spaces that generally contour the shape of the side portions and an exterior perimeter of the generator housing.

10. The generator housing according to claim 1, wherein the flow chambers of the side portions each include an end opening, such that cooling air may flow between the flow chambers of the side portions and through the end openings, and the flow chambers of the side portions each include a side opening, such that cooling air may flow from the flow chambers of the side portions and through the side openings into the interior space.

11. The generator housing according to claim 10, wherein one of the side openings is configured to provide cooling air to an engine of a generator that may be contained in the generator housing, and is configured to provide cooling air to an alternator of a generator that may be contained in the generator housing.

12. The generator housing according to claim 1, wherein one of the side portions comprising a rear side portion, the rear side portion including an exhaust flow chamber built therein, the exhaust flow chamber includes an opening configured to receive exhaust and air from the interior space.

13. The generator housing according to claim 12, wherein the flow chamber of the top portion comprises an air intake chamber and an exhaust and air release chamber, the flow chambers of the side portions cooperate with the intake chamber and the release chamber of the top portion, such that the intake chamber receives cooling air and facilitates flow of the cooling air into the side chambers, the side chambers facilitate flow of the cooling air to the interior space, the exhaust flow chamber receives exhaust and air from the interior space and facilitates flow of exhaust and air into the release chamber, and the release chamber facilitates flow of exhaust and air out of the generator housing.

14. The generator housing according to claim 13, wherein release chamber comprises an insulator disposed within the release chamber, the insulator configured to insulate the top portion from exhaust temperatures, and comprising a plurality of support ribs creating air pockets between the insulator and an inner surface of the top portion.

15. The generator housing according to claim 1, wherein the top portion comprises a main body configured as an overhanging cover relative to the side portions, the main body constructed an arranged with an overcurve profile, and including underside openings for access to the flow chambers of the top portion.

16. The generator housing according to claim 1, wherein the top, side, and base portions are configured to contain one of a home standby generator set or a small office standby generator set.

17. A method for cooling and attenuating sound produced by a generator comprising:

containing a generator within an interior space of a generator housing, the generator housing including a top portion, a plurality of side portions, and a base portion, the top and side portions include a flow structure that facilitates intake of cooling air and release of exhaust and air, the flow structure comprising flow chambers built within the top and side portions;

receiving cooling air from outside the generator housing and into one of the flow chambers of the top portion and directing the cooling air into flow chambers of the side portions;

facilitating flow of the cooling air to the generator;

directing air and exhaust created by the generator to another chamber of the top portion;

releasing air and exhaust created by the generator out of the generator housing, and the steps of receiving cooling air, facilitating flow of the cooling air, and directing air and exhaust include facilitating intake and exit through the flow chambers that are housed within the top and side portions, wherein the flow chambers are hollowed out spaces that define multiple volumes therein, the top and side portions are structured and arranged such that the volumes of the flow chambers are distinct from the interior space.

18. A generator housing comprising:

a top portion;

a plurality of side portions; and a base portion, the top, side, and base portions form an enclosure within an interior space for housing a generator therein, the top and side portions include a flow structure that facilitates intake and release of air, the flow structure comprising flow chambers built within the top and side portions, the flow chambers direct air to flow into and throughout the housing and direct air and exhaust to flow out of the housing, the flow structure provides cooling air inside the housing, provides a sound attenuation function, and releases air from inside the housing, and the flow chambers are housed within the top and side portions, such that the flow chambers are hollowed out spaces that define multiple volumes therein, the top and side portions are structured and arranged such that the volumes of the flow chambers are distinct from the interior space.

* * * * *